United States Patent
Demay

[11] 3,920,289
[45] Nov. 18, 1975

[54] LINEAR ROLLER BEARING

[76] Inventor: Gerard Demay, Villa Helene, 8 Rte. de Lescar, 64000 Lons-Pau, France

[22] Filed: Apr. 30, 1974

[21] Appl. No.: 465,491

[30] Foreign Application Priority Data
May 2, 1973 France .................. 73.15635

[52] U.S. Cl. ......................................... 308/6 C
[51] Int. Cl.² ................................... F16C 29/04
[58] Field of Search ........................... 308/6 C

[56] References Cited
UNITED STATES PATENTS

| | | | |
|---|---|---|---|
| 3,219,398 | 11/1965 | Anderson | 308/6 C |
| 3,230,018 | 1/1966 | Stallman | 308/6 C |
| 3,246,933 | 4/1966 | Better | 308/6 C |
| 3,357,753 | 12/1967 | Ionov | 308/6 C |

FOREIGN PATENTS OR APPLICATIONS

| | | | |
|---|---|---|---|
| 1,193,830 | 11/1959 | France | 308/6 C |

*Primary Examiner*—Robert S. Ward, Jr.
*Assistant Examiner*—Gene A. Church
*Attorney, Agent, or Firm*—Darby & Darby

[57] ABSTRACT

A roller bearing constituted by a unitary block provided with longitudinal flanges in which roller guiding grooves are cut so that the rollers may run between said grooves along a track surrounding the body of the block. The grooves can readily be cut by means of an oblique tool, said grooves thereby forming a continuous symmetrical loops without any gap or joint.

17 Claims, 20 Drawing Figures

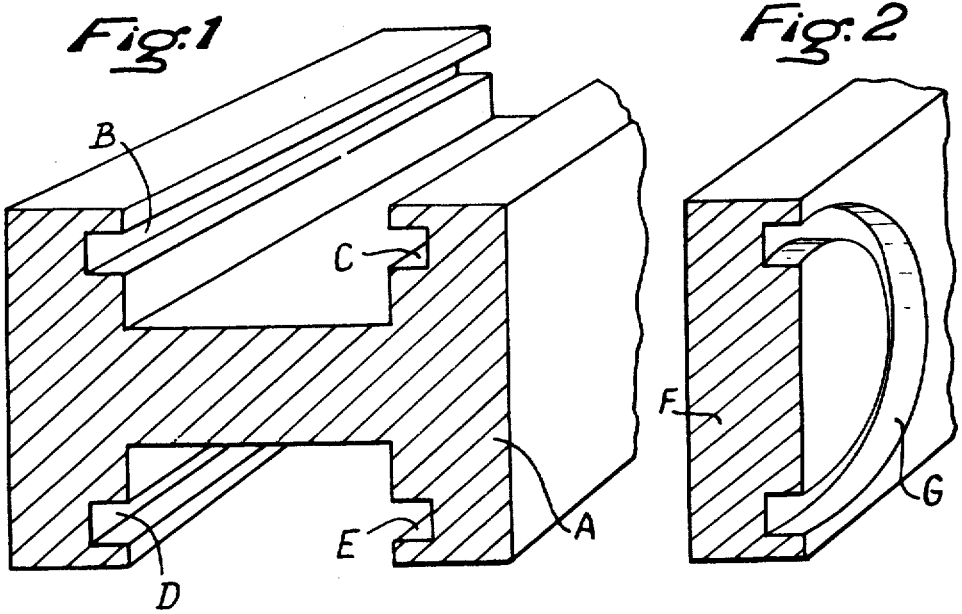
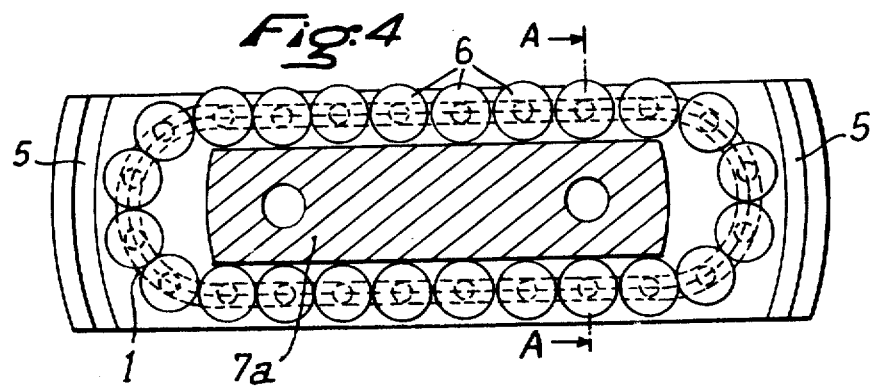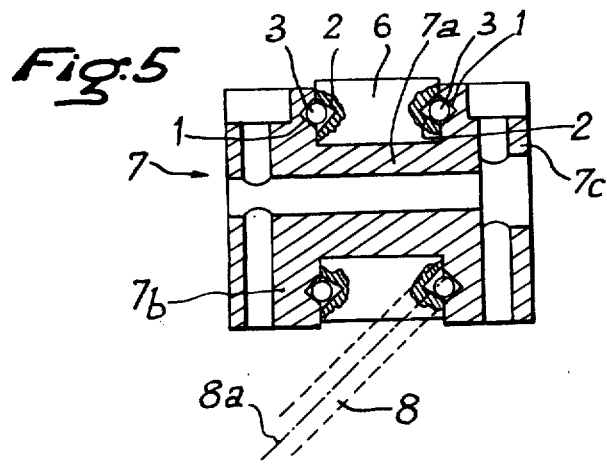

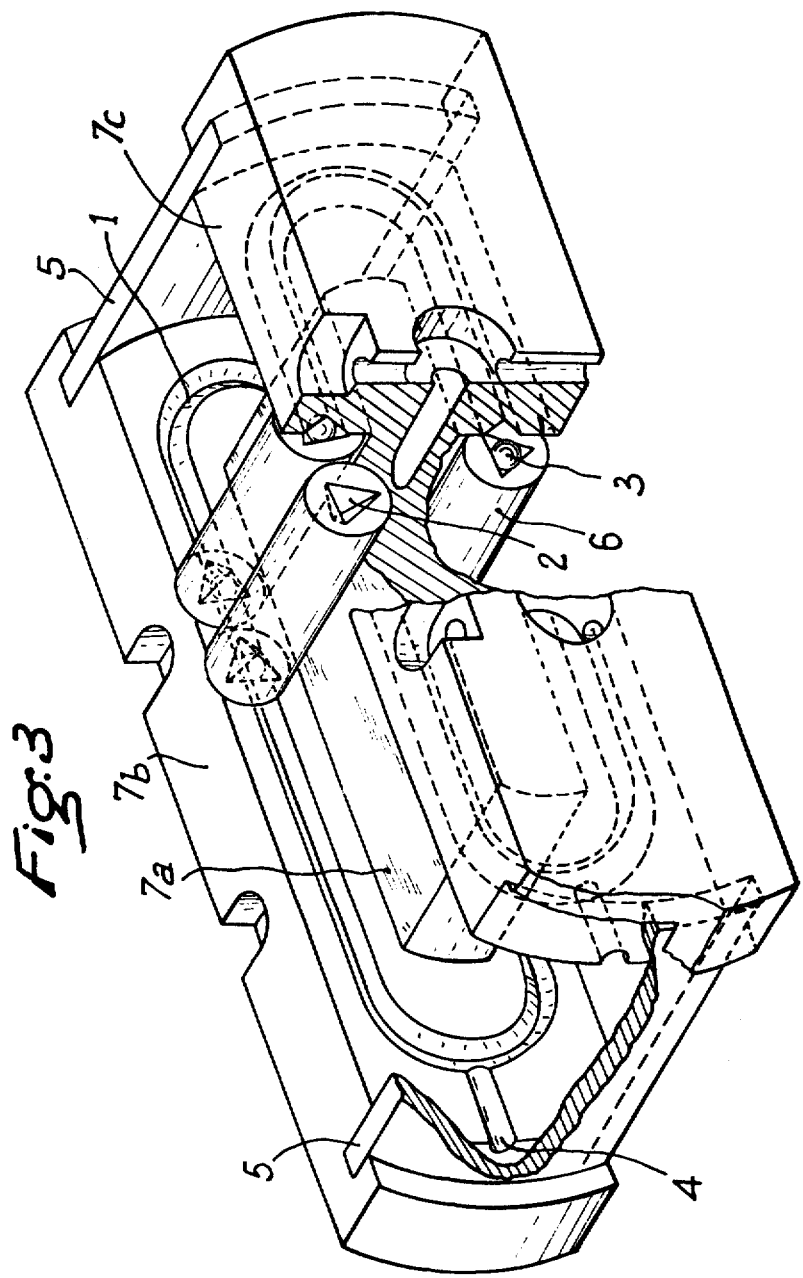

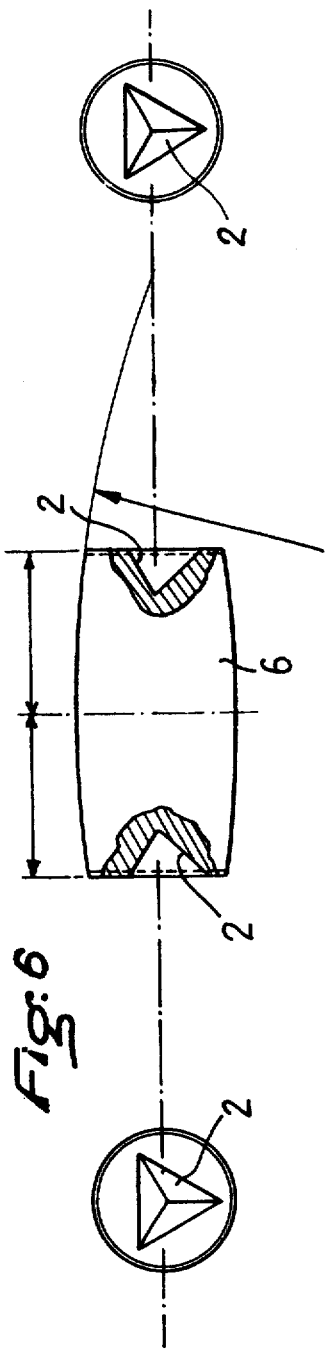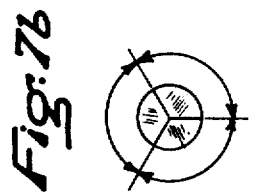

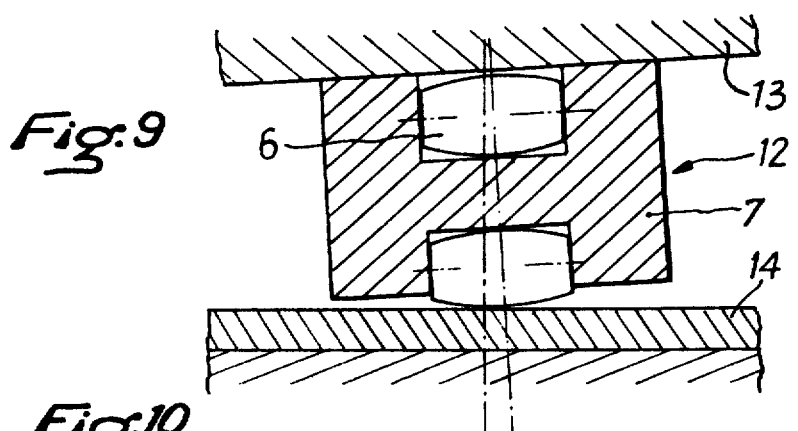
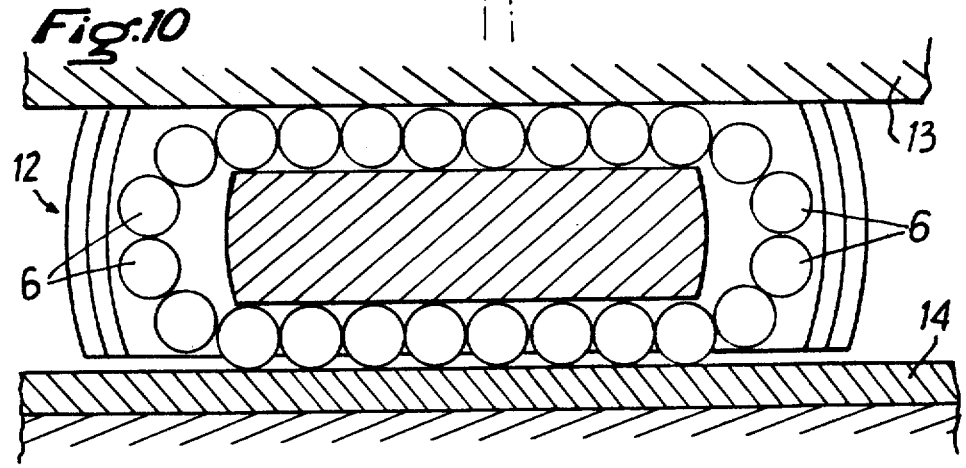
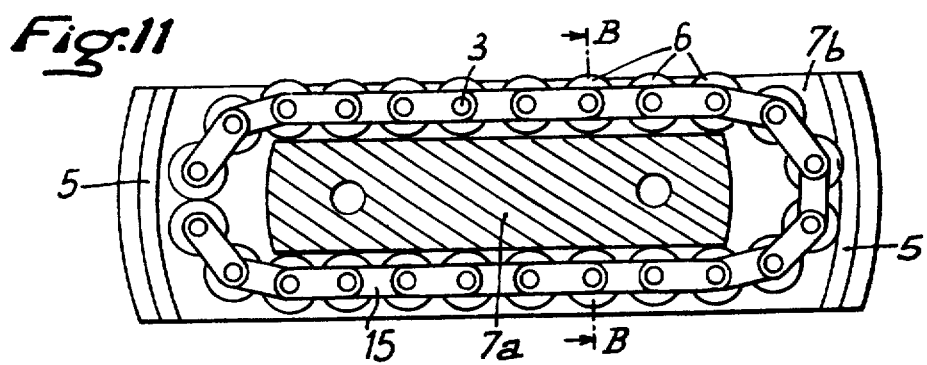
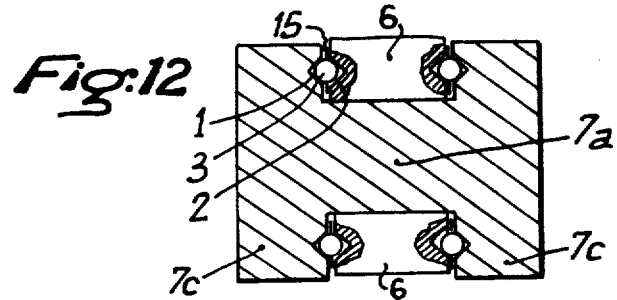

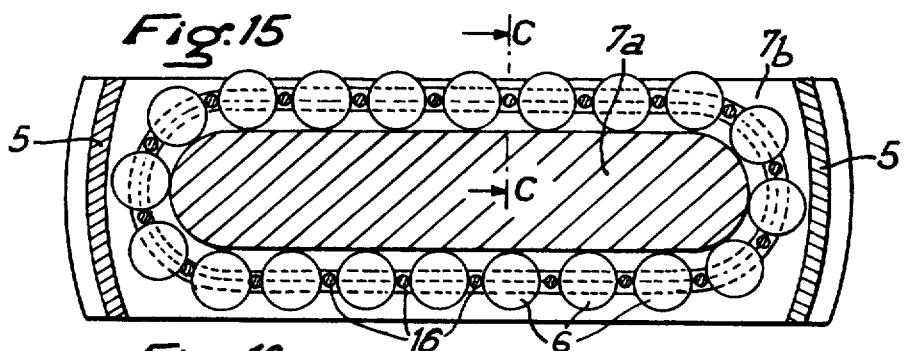
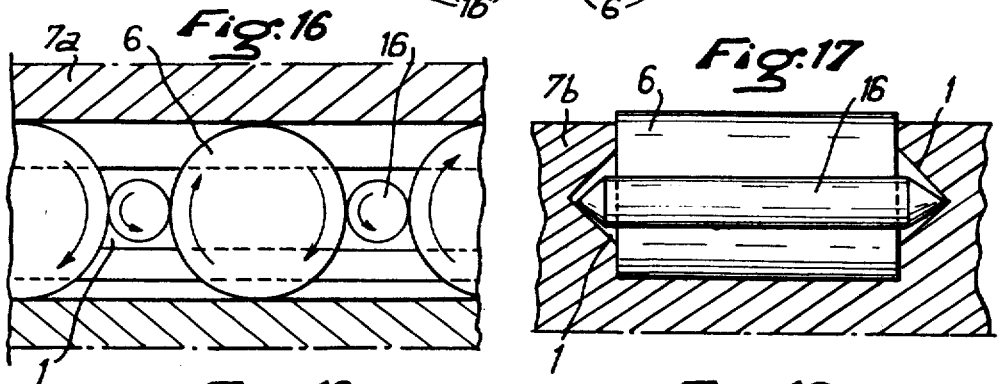
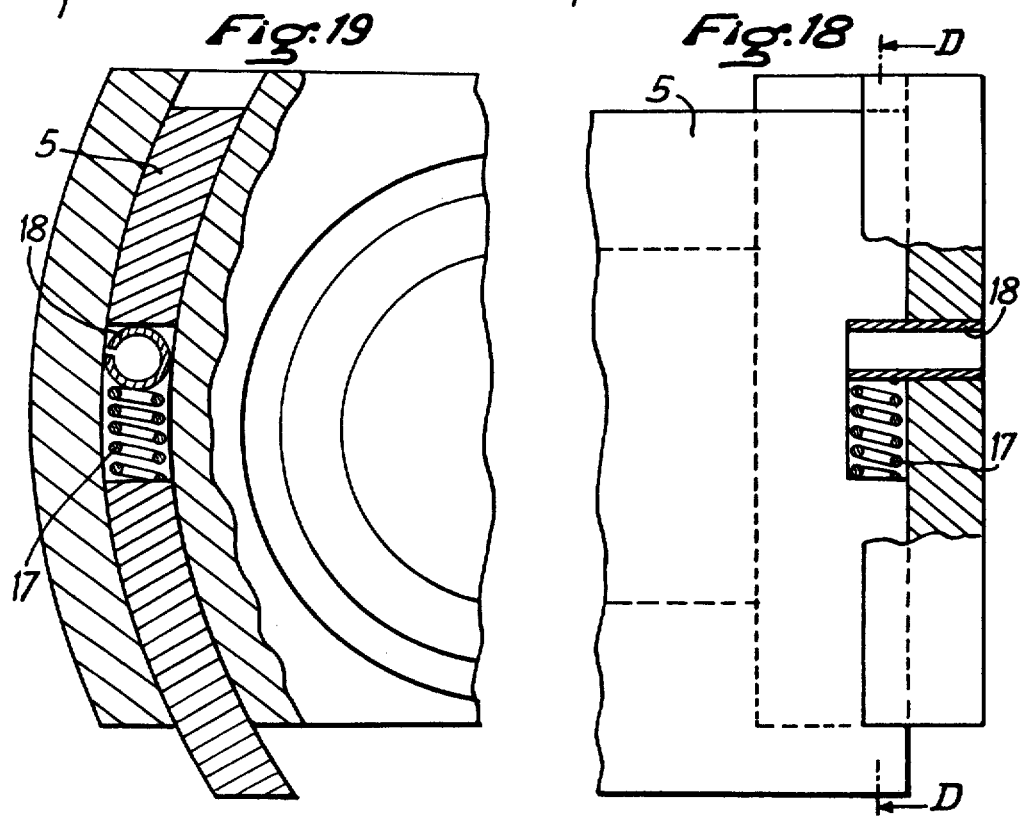

3,920,289

LINEAR ROLLER BEARING

My invention has for its object linear roller bearings, generally termed roller shoes, chiefly adapted to be fitted on machine-tools so as to allow the translational motion of carriages over relatively large distances under heavy loads, with a reduced frictional coefficient, such bearings ensuring highly accurate guiding.

Roller bearings of such a type are generally executed by machining a parallelopipedic block so as to form therein two grooves having a rectangular cross-section and facing each other, respectively in the upper part and in the lower part of the block. The upper grooves are connected with the cooperating lower grooves by means of arcuate grooves formed in auxiliary blocks fitted at the opposite ends of the main blocks considered. Such an arrangement allows the actual rollers, the ends of which are provided with cylindrical studs engaging the successive grooves, to run continuously along the latter.

This combination of blocks forming the grooves has the drawback of having a gap in the guiding surfaces at the points registering with the joints between the different blocks constituting the bearing. This results in that the rollers become damaged with time and assume slightly transverse positions during their cyclical travel. This locks the bearing and thereby the entire machine-tool which can be restarted only after the linear bearing which has been the cause of the failure has been replaced, such a replacement possibly leading to a long downtime of an expensive machine-tool.

My invention removes these drawbacks and my improved linear roller bearing is constituted, according to said invention by a single block provided with two endless grooves arranged symmetrically and facing each other, said groove and the surface in which they are cut showing no gap in their outlines.

According to a preferred embodiment of my invention the cross-section of each groove is V-shaped and each roller is provided at each end with a tetrahedric recess, a ball being fitted in each recess so as to engage the V-shaped groove, thereby to ensure the guiding of the roller.

By way of example and in order to further the understanding of the invention, the accompanying drawings include the following figures:

FIG. 1 is a diagrammatic perspective view of the main block of a conventional linear bearing block;

FIG. 2 is a diagrammatic perspective view of a terminal block adapted to return the rollers into the main block, such a terminal block to be fitted at each end of the main block FIG. 1;

FIG. 3 is a partly sectional view of my improved roller bearing partly in section and partly broken away;

FIG. 4 is a longitudinal cross-section of the roller bearing according to FIG. 3;

FIG. 5 is a cross-section through line A—A of FIG. 4;

FIG. 6 is a detail view of a roller for the bearing according to FIGS. 3 to 5;

FIGS. 7a and 7b are views of a tool and of the recess formed by it in a roller;

FIG. 8 is a view of a roller during its machining;

FIGS. 9 and 10 are two diagrammatic views illustrating the operation of the linear roller bearing according to FIGS. 3 to 5;

FIG. 11 is a longitudinal sectional view of a modification of the bearing according to FIGS. 3 to 5;

FIG. 12 is a sectional view through line B—B of FIG. 11;

FIG. 15 is a longitudinal sectional view of a further modification;

FIG. 16 is a view on an enlarged scale of a detail of FIG. 15;

FIG. 17 is a sectional view through line C—C of FIG. 15;

FIG. 18 is a partly broken away view of a portion of a modified cover for the end of the bearing;

FIG. 19 is a sectional view through line D—D of FIG. 18.

Figure 13:
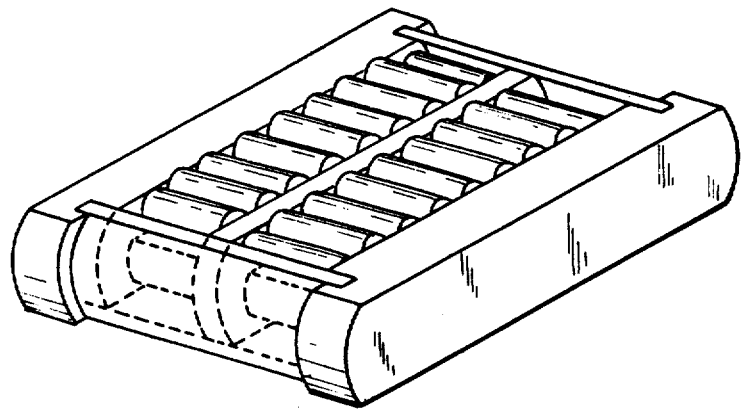
FIGS. 13 and 14 are perspective views of two modifications.

Turning to FIGS. 1 and 2, it is apparent that a conventional linear roller bearing includes a main central block A inside which are milled four grooves B—C-D-E, the grooves B-C, on the one hand, and the grooves D-E on the other hand being arranged in perfect symmetrical relationship.

At each end of the main block A there are fitted roller-returning blocks F, to wit two terminal blocks provided each with a groove G interconnecting the corresponding ends of the grooves B and D and two terminal blocks arranged symmetrically of the first mentioned blocks and provided each with a groove interconnecting the corresponding ends of the grooves C and E. The use of such terminal blocks is essential for it to be possible to mill the interconnecting grooves G.

A series of rollers, the opposite ends of which extend into cylindrical studs sliding inside the grooves, is carried by the assembly of the main block A with the terminal block F.

It has been found that whatever the care in the machining and assembly of the blocks, modifications appear unavoidably in the alinement between the block A and the roller-returning blocks F, which results in the rollers assuming a slanting position and jamming.

Turning now to FIGS. 3 to 5, these figures show a bearing constituted by a single block 7 machined so as to form a central section 7a and two lateral flanges 7b and 7c. In the inwardly facing walls of said flanges 7b and 7c, there are cut endless grooves 1 facing each other.

Since the grooves 1 are cut inside a unitary block, no modifications can appear with time, under the action of vibrations, in the alinement of the parts and, consequently, no jamming can occur.

The grooves may assume any desired shape. However, it has been found that the most advantageous shape is that for which the cross-section of the grooves is V-shaped. On the one hand, this allows, as illustrated in FIG. 5, milling the grooves 1 by means of a cutter 8 engaging obliquely the inwardly facing surfaces of the flanges 7b and 7c, which allows an excellent guiding to be obtained for the rollers. For this purpose, each roller 6 is cut at each end, so as to have a tetrahedric recess at 2. The means serving for the cutting of such a recess will be disclosed hereinafter in detail with reference to FIG. 7.

Each recess 2 houses a ball 3 engaging the corresponding groove 1, so that, as illustrated clearly in FIG. 5, each roller is held in position at each end by a ball 3 engaging through three points the recess 2 and, through two points, the groove 1. Each remains set in the housing formed by the recess while running freely along the groove 1.

Two symmetrical passageways 4 (FIG. 3) provided on either side of one end of the block 7 allow the rollers 6 and their balls 7 to be introduced into the grooves for assembly.

A cover 5 closes said passageways 4 Preferably, the height of said cover is equal to the thickness of the block 7, so that it may serve as a scraper as disclosed hereinafter, in which case a symmetrical cover is laid over the opposite end of the block 7.

In the embodiment illustrated in FIGS. 3 to 5, the V-shaped cross-section of the groove 1 shows two oblique surfaces at 90° with reference to each other. In such a case, the cutter 8 is a straight drill and its axis 8a extends at 45° with reference to the inwardly facing surfaces 7b and 7c.

FIGS. 6 shows that each roller is not perfectly cylindrical and assumes a barrel shape with a very slight curvature.

As a matter of fact, by way of example, in a roller with a maximum diameter equal to 5 mm and a length equal to 10mm, the radius of curvature of the roller outline may be equal to 1000 mm.

FIG. 7a shows a tool 9 the tip of which is provided with three symmetrically distributed surfaces sloping at 30° with reference to the tool axis; FIG. 7b shows the recess formed by such a tool 9 in the terminal surfaces of the roller 6 subjected to a punching by said tool the recess formed is consequently provided with three surfaces sloping at 30° and the apical angles of which are equal to 120°.

FIG. 8 shows how the outer peripheral surface of the roller 6 is machined, so as to make it assume the bulging shape shown in FIG. 6. This is accomplished by introducing inside one of the recesses 2, the left-hand recess for instance, a driving mandrel 10, the tip of which is shaped in the same manner as the tip of the tool 9 while there is introduced inside the other recess 2 a mandrel 11 having a part spherical tip, the diameter of which approximates that of the ball 3. The roller 6 is thus firmly held against transverse shifting, and it is driven into rotation by the mandrel 10 the tip of which engages the correspondingly shaped recess 2 in the roller.

FIGS. 9 and 10 show, by way of example, a particular application of a roller bearing according to my invention. Said roller bearing designated generally by the reference number 12 carries a carriage 13 and runs over a platform 14. The rollers 6 running along the lower raceway project downwardly beyond the lower surface of the block 7 whereas the rollers 6 running along the upper raceway slide underneath the carriage 13 without any contact therewith. Assuming the size and shape of the rollers are those mentioned hereinabove by way of example, and the carriage produces a load of two metric tons of the bearing 12, it is found that each roller 6 engages the platform 14 in practice over a breadth of about 6 mm, even if the parallelism between the carriage 13 and the platform 14 is disturbed by say one-eighth of a degree towards the right-hand side or towards the left-hand side. The latter would correspond to a defect in parallelism by 0.10 per 100 mm, which is quite noticeable in machine-tools with a long travelling distance.

FIGS. 11 and 12 show a modification in the bearing illustrated in FIGS. 3 to 5, which consists in inserting between the recess 2 in each roller and the groove 1, a chain 15 provided with holes the diameter of which is slightly larger than that of the balls 3 engaging them, the links of said chain forming stays holding the successive rollers apart.

Figure 14:
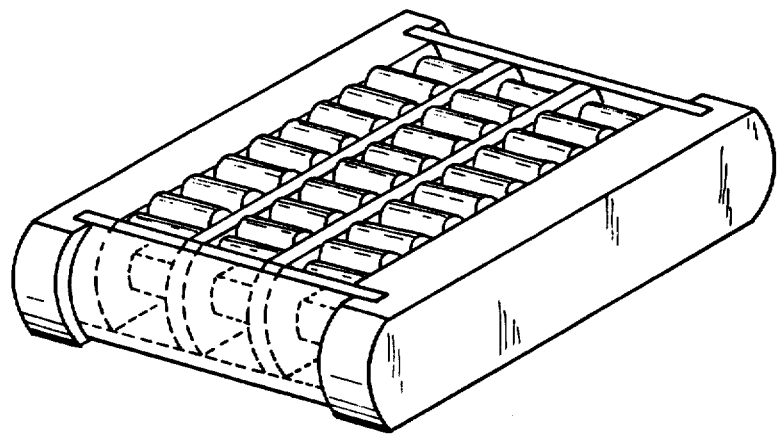

FIGS. 13 and 14 illustrate two modifications of which one includes twin raceways and the other three parallel raceways. Such an arrangement would be difficult in the case of conventional roller arrangements since it is practically impossible to execute two or three roller-returning means, such as the grooves G of FIG. 2, in perfectly alined relationship.

In the further embodiment illustrated in FIGS. 15 and 16, the successive rollers are separated by pins 16 so that when the rollers roll in a predetermined direction, the pins pivot in the opposite direction and prevent the rollers from frictionally engaging one another. The arrows in FIG. 16 show the direction of rolling of the rollers and the direction of the pivotal motion of the pins respectively.

As shown in FIG. 17, the pins 15 terminate with conical tips the apex angle of which is slightly less than the angular opening formed by the groove 1. For instance, for a groove the angular width of which is 90°, the conical tips should show an apex angle of 80°, the tips of the pins engaging the grooves in proximity with the bottom of the latter.

In the further modification illustrated in FIGS. 18 and 19, the cover 5 actually plays the part of a scraper. To this end, it is provided, towards the middle of its sides, with two notches extending in vertical planes and adapted to house a spring engaging the pin 18. The latter is rigid with the block 7, so as to urge the cover 5 downwardly into the position illustrated, whereby the lower edge of the cover acts as a scraper. When setting the bearing in its operative position, the cover should be raised. This compresses the spring, the spring ensuring subsequently an elastic engagement of the scraper.

According to an embodiment which is not illustrated, the unitary block and the rectilinear sections of the grooves 1 may be slightly incurved while remaining in parallel relationship. Thus the linear roller bearing may be slightly concave along its upper surface and slightly convex along its lower surface or reversely. This allows the use of concave or convex shoes for the shifting of parts having a large radius of curvature without resorting to bearings provided with correspondingly large radii of curvature.

What I claim is:

1. A linear roller bearing comprising a unitary elongated block of a single piece of material including a body and two longitudinal flanges rigid therewith projecting beyond the longitudinal outline of the body throughout its extent, an endless groove formed in each flange extending in a longitudinal plane along two longitudinal lines interconnected by curved lines on the outside of said body outline, the grooves in said flanges being arranged symmetrically and facing each other, a series of rollers extending transversely of the body, the opposite ends of the rollers being substantially flat and guided against the inner faces of the flanges, and means engaging the rollers and the walls of the grooves in the flanges for holding the rollers in place as they traverse the path defined by the grooves.

2. A roller bearing as in claim 1, wherein the grooves are V-shaped in cross-section.

3. A roller bearing as in claim 1 wherein the outer surface of each roller is barrel-shaped.

4. A roller bearing as in claim 1 wherein the outer surface of each roller is barrel-shaped and the radius of curvature of the generating line of the barrel is about one hundred times the length of the roller.

5. A roller as in claim 1 wherein the outline of the body is slightly incurved in the longitudinal plane of its outline and assumes a slight concavity in one direction and a slight concavity in the opposite direction.

6. A roller bearing as in claim 1 further comprising a third flange extending between and parallel to said two longitudinal flanges and provided with further endless grooves arranged symmetrically of the grooves in the cooperating flanges and facing last mentioned grooves to guide the rollers between said further and last-mentioned groove.

7. A roller bearing according to claim 1 wherein there is a substantially tetrahedric recess in each end of each roller.

8. A roller bearing according to claim 7 where the tetrahedric recess has three triangular surfaces sloping at an angle of about 30° with reference to the longitudinal axis of the roller and the apex of which extends over 120°.

9. A roller bearing as in claim 1 further comprising pins extending between the successive rollers and the peripheries of which are in contact with the peripheries of the adjacent rollers to pivot under the action of the latter.

10. A roller bearing as in claim 1 wherein the means for holding the rollers in place comprises a pin at each of the ends of the rollers which engage the walls of the corresponding grooves.

11. A roller bearing as in claim 1 further comprising a cover slidingly carried at each transverse end of the block and means urging said cover into a position projecting transversely of the block in a direction parallel to said longitudinal plane to make it act as a scraper.

12. A roller bearing as in claim 1 wherein the means for holding the rollers in place comprises a recess formed in each end of the roller, and a ball housed in each recess and riding in the groove of the respective oppositely facing flange.

13. A roller bearing as in claim 10 wherein the grooves in the flanges are generally V-shaped and the ends of the pines engaging the walls of the grooves are generally conical in shape.

14. A roller for a linear roller bearing, the outer surface of said roller having a generally barrel shape.

15. A roller as in claim 14 wherein the radius of curvature of the generating line of the outer surface of the barrel shape is about one hundred times the length of the roller.

16. A roller as in claim 14 wherein the tetrahedric recess is formed in an end of the roller.

17. A roller bearing as in claim 16 wherein the tetrahedric recess has three triangular faces sloping at an angle of about 30° with reference to the longitudinal axis of the roller and the apex of which extends over 120°.

* * * * *